July 5, 1949.  R. DEL CUETO  2,475,544
RADIANT ENERGY COLLECTOR
Filed Sept. 5, 1946
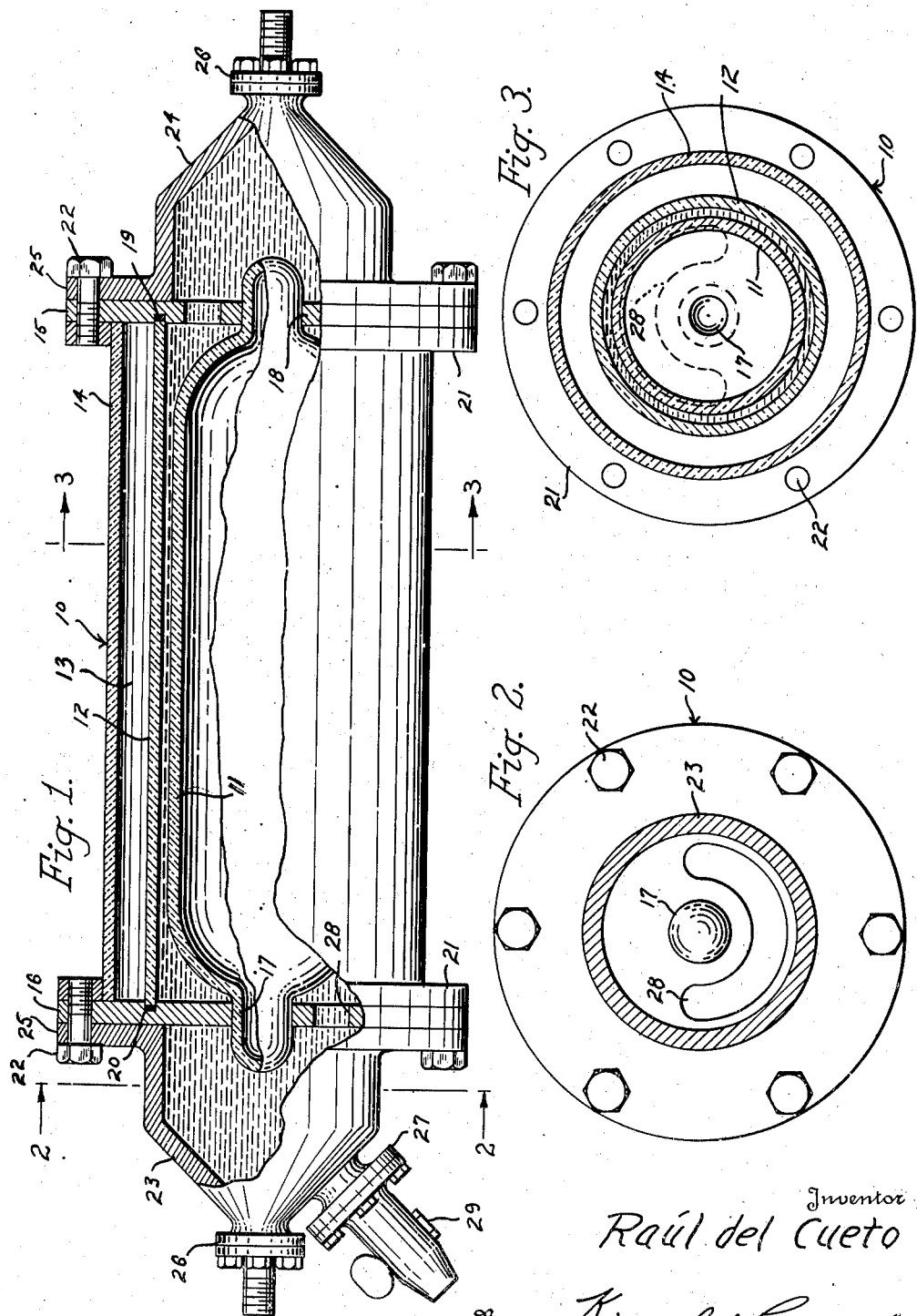
Inventor
Raúl del Cueto
By Kimmel & Crowell
Attorneys Patented July 5, 1949

2,475,544

UNITED STATES PATENT OFFICE 2,475,544

RADIANT ENERGY COLLECTOR

Raul del Cueto, Papantla, Veracruz, Mexico

Application September 5, 1946, Serial No. 695,064
In Mexico September 25, 1945

3 Claims. (Cl. 257—250)

This invention relates to certain useful improvements in radiant energy collectors for making possible the maximum utilization of radiant energy from natural or artificial sources.

At the present time, the utilization of radiant energy has been accomplished by means of costly and complicated apparatus and devices, which substantially provide the combination of reflecting means for the concentration of energy with an element where the liquid, whose temperature will be raised is kept in circulation. Such apparatus has not had successful practical results due to the complicated installation which requires great space, and because they use a minimum amount of the radiant energy concentrated on the collector.

Another disadvantage of these known devices, is their necessary careful and permanent orientation relative to the sun or other source of energy to permit their reflecting means to concentrate the energy on the tube or collecting device.

It is an object of this invention to provide a collector for the accumulation of thermal energy, to make possible its maximum accumulation and utilization in a liquid or gaseous mass, with an exaggerated exterior receiving surface relative to the volume of fluid contained therein.

Another object of this invention is to provide a radiant energy collecting device, in which the incident radiant energy is accumulated in a fluid mass in tubular form, of circular or oval cross section, with walls of a predetermined thickness to provide for the maximum collection of energy in a minimum of time.

Another object of this invention is to provide an energy collecting device of the kind to be hereinafter described which does not require the use of reflecting elements to concentrate the energy, the energy being collected directly from the source thereof.

Another object of this invention is to provide a radiant energy collector of this kind in which the particular construction eliminates the need for a change of position of the apparatus according to the solar annual declination.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a side elevation, partly broken away and partly in section, of a radiant energy collecting device constructed according to an embodiment of my invention.

Figure 2 is a vertical section taken on the line 2—2 of Figure 1, and

Figure 3 is a vertical section taken on the line 3—3 of Figure 1.

Referring to the drawings the numeral 10 designates generally a collecting device for collecting and accumulating radiant energy as heat in the liquid passing through. The device 10 comprises in general a central bulb or shell 11, an intermediate wall 12 and an outer wall 14, supported in spaced apart relation by end walls 15 and 16.

The inner bulb or shell 11 comprises an elongated cylindrical body which may be made of any suitable material as glass or metal which will maintain its shape and configuration despite the deteriorating effects of any fluid used in the device 10. The shell 11 is closed at both ends and is formed with endwise extending reduced diameter concentric extensions 17 which may readily be formed on the shell 11 for supporting the shell 11 within the device 10 from each end wall 15 and 16. The interior surface of the bulb 11 may be covered with a reflecting element, as a silver deposit or other silvered surface, to increase the accumulation of the thermal energy.

The end walls 15 and 16 are formed of a flat annular disc each having a central concentric opening 18 in which the extensions 17 of the bulb 11 are adapted to be engaged. The walls 15 and 16 are formed also with an annular concentric groove 19 spaced inwardly from the periphery of the disc for supporting the intermediate wall 12 therebetween.

The intermediate wall 12 comprises an elongated tubular body of glass or other transparent material which the light rays may readily penetrate. The cylinder 12 is supported so that its inner surface is held in a slight spaced apart relation to the length of the bulb 11, so that the fluid in the device, which will be contained between the bulb 11 and wall 12, will be spread in a thin chamber between the walls in order that the surface area of the fluid will be greatly exaggerated relative to the volume of the same fluid. The ends of the cylindrical wall 12 engage in the annular grooves 19 and may be hermetically sealed by a seal 20 engaging in the grooves 19 between the cylinder 12 and end walls 15 and 16. An outer wall 14 is provided to be held about the intermediate wall 12 to be spaced therefrom for providing an insulating space 13 between the outer wall 14 and intermediate wall 12. The outer wall 14 is formed of an elongated tubular transparent body made of glass or the like having annular flanges 21 fixed to each end for securing the wall 14 to the end discs 15 and 16 by bolts 22 or other suitable fastening means.

End sections or covers 23 and 24 are fixed to the outer side of the discs 15 and 16 to provide connecting means for the inlet and discharge of the fluid to be heated. The end sections 23 and 24 are formed of a substantially conical housing having an outwardly extending flange 25 at the inner divergent end for fastening the ends to the discs 15 and 16. The apex of each end section 23 and 24 are provided with pipe fittings 26 through which the fluid may be passed to be circulated in the device 10 or series of such devices. One of the end sections, as 23, may be provided with a valved outlet 27 for draining the heated fluid from the device 10.

The insulating space between the outer wall 14 and intermediate wall 12 may be evacuated, if desired, to provide a more efficient insulation for retaining the thermal energy in the irradiated fluid. The fluid in this device may be a liquid or gas as required.

In the use and operation of this device 10 the fluid is admitted at one end through a housing, as 24, whence it is circulated about the bulb 11 by passing through openings 28 in the discs 15 and 16. The fluid is spread into a relatively thin film between the walls of the bulb 11 and tube 12 whereby the surface of the fluid is greatly increased in area for absorbing a maximum amount of radiant thermal energy, direct and reflected, in a minimum of time. The irradiated fluid may be taken from the device 10 at the opposite end housing 23 through outlet 27 and valve 29 when heated sufficiently, or may be circulated to an adjacent similar device 10 through the other end, 23, for further exposure to the source of radiant energy.

I do not mean to confine myself to the exact details of construction herein disclosed but claim all variations falling within the purview of the appended claims.

Having thus described my invention, what I claim is:

1. A radiant energy collecting device of the kind described comprising an outer transparent cylindrical member, apertured end walls on said cylindrical member, a fluid inlet and outlet member on the opposite end walls communicating with said apertures, an intermediate transparent cylinder within said cylindrical member carried by said end walls spaced from said cylindrical member providing an insulating space therebetween, and an inner cylindrical member carried by said end walls, the surface of said inner member being disposed closely adjacent the inner surface of said intermediate member providing a thin space therebetween through which the fluid is free to flow.

2. A radiant energy collecting device of the kind described comprising an outer transparent cylindrical member, apertured end walls on said cylindrical member, a fluid inlet and outlet member on the opposite end walls communicating with said apertures, an intermediate transparent cylinder within said cylindrical member carried by said end walls spaced from said cylindrical member providing an insulating space therebetween, an inner cylindrical member carried by said end walls, the surface of said inner member being disposed closely adjacent the inner surface of said intermediate member providing a thin space therebetween through which the fluid is free to flow, and a reflecting coating on the outer surface of said inner member.

3. A radiant energy collecting device of the kind described comprising an outer transparent tubular member, end walls on said outer member, an intermediate transparent tubular member fixed between said end walls and spaced inwardly from said outer member providing a closed insulating space therebetween, an inner cylindrical member fixed between said end walls concentric to said intermediate member and spaced therefrom to provide a restricted fluid passage therebetween, said end walls formed with openings constituting fluid inlet and outlet ports at the opposite ends of said device, and fluid conductor connectors carried by said end walls for connecting said device to a source of fluid supply.

RAUL DEL CUETO.

REFERENCES CITED

The following references are of record in the file of this patent:

UNITED STATES PATENTS

| Number | Name | Date |
|---|---|---|
| 1,661,473 | Goddard et al. | Mar. 6, 1928 |
| 1,946,184 | Abbot | Feb. 6, 1934 |
| 2,133,649 | Abbot | Oct. 18, 1938 |
| 2,205,378 | Abbot | June 25, 1940 |